（12）United States Patent
Vadlamani

(10) Patent No.: US 10,216,784 B1
(45) Date of Patent: Feb. 26, 2019

(54) REFERENTIAL SAMPLING OF POLYGOT DATASETS

(71) Applicant: Talena, Inc., Milpitas, CA (US)

(72) Inventor: Srinivas Vadlamani, Sunnyvale, CA (US)

(73) Assignee: Imanis Data, Inc., San Jose, CA (US)

( * ) Notice: Subject to any disclaimer, the term of this patent is extended or adjusted under 35 U.S.C. 154(b) by 762 days.

(21) Appl. No.: 14/866,558

(22) Filed: Sep. 25, 2015

Related U.S. Application Data

(60) Provisional application No. 62/055,396, filed on Sep. 25, 2014.

(51) Int. Cl.
*G06F 17/30* (2006.01)

(52) U.S. Cl.
CPC .. *G06F 17/30377* (2013.01); *G06F 17/30958* (2013.01)

(58) Field of Classification Search
None
See application file for complete search history.

(56) References Cited

U.S. PATENT DOCUMENTS

| | | | | |
|---|---|---|---|---|
| 8,797,178 B2* | 8/2014 | Kansal | ............... | H04Q 9/00 340/870.01 |
| 2006/0164997 A1* | 7/2006 | Graepel | ............ | G06F 11/3447 370/241 |

* cited by examiner

*Primary Examiner* — Belix M Ortiz Ditren
(74) *Attorney, Agent, or Firm* — Brokaw Patent Law PC; Christopher J. Brokaw

(57) ABSTRACT

Approaches for referential sampling of disparate datasets. An execution mode and a sampling mode are determined for each entity in a plurality of disparate datasets. A directed acyclic graph (DAG) for each entity in the plurality of disparate datasets is created. The directed acyclic graph (DAG) is topologically sorted to produce a topologically sorted directed acyclic graph (DAG). One or more sampled datasets are retrieved from the plurality of disparate datasets using the topologically sorted directed acyclic graph (DAG). Advantageously, the one or more sampled datasets are a consistent sample that honors all referential constraints in the plurality of disparate datasets.

12 Claims, 3 Drawing Sheets

REFERENTIAL SAMPLING OF POLYGOT DATASETS

CLAIM OF PRIORITY

This application claims priority to U.S. Provisional Patent Application No. 62/055,396, entitled "Referential Sampling of Polygot Datasets," invented by Srinivas Vadlamani, filed on Sep. 25, 2014, the contents of which are hereby incorporated by reference for all purposes as if fully set forth herein.

FIELD OF THE INVENTION

Embodiments of the invention relate to referential sampling of disparate datasets.

BACKGROUND

Sampling or subsetting is a data management technique to extract a representative sample of a primary or production dataset for the purpose of deploying the representative sample on a smaller test, development, or research cluster. Mechanisms exist to sample a single dataset, such as a table or a file; however, applying those mechanisms to multiple datasets, such as all tables in a database, does not guarantee a "consistent" sample, i.e., a sample that honors the referential constraints between the datasets.

As an example, consider a typical data model involving two tables, named Customers and Orders, where the Customers table stores personal information for known customers, while the Orders table stores information about customer orders over time. A relationship between the tables is established by means of a customer_id attribute that is defined in the Customers table and referenced in the Orders table for every order placed by the customer. Thus, the customer_id attribute acts as a referential constraint for the Orders table.

Given these two tables, simply taking a 10% sample of each of the two tables to obtain a sampled dataset will not guarantee that for every row in the sampled Orders table there will be a corresponding row in the sampled Customers table within the sampled dataset. Hence, the sampled dataset cannot be said to be consistent.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for referential sampling of polygot datasets are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Embodiments of the invention are directed towards sampling data across multiple datasets in a manner observing the referential constraints underlying the data model so that the sampled output is consistent, i.e., the sampled output honors the referential constraints between the datasets. The approaches described herein may be used to sample data across disparate datasets, such as but not limited to, data warehouses, NoSQL databases, and filesystems. Consequently, embodiments of the invention are "polygot" in nature; that is to say, embodiments can sample consistent datasets across a plurality of disparate datasets having a variety of different formats.

For a given set of datasets to be sampled, embodiments assume that the relationships between the datasets are already defined and available.

Embodiments of the invention support two different sampling modes, namely a direct mode and a referential mode. The direct sampling mode is used for sampling a dataset on its own (i.e., only one dataset is sampled). The direct sampling mode may specify how much data is to be sampled in terms of a percentage (such as 10% or 20%) or in terms of absolute size (such as 100 GB or 1 TB). In contrast, the referential sampling mode is used for sampling a dataset in relation to other datasets that may themselves be direct sampled or not sampled at all.

Embodiments of the invention also support two different execution modes, namely a native mode and a non-native mode. In the native execution mode, sampling is performed natively at the primary/production site. Doing so is optimal from a network/storage perspective because only the sampled output need be transferred to a secondary site for processing and/or storage. Note that the native execution mode requires that the primary/production site has the ability and/or computational resources to perform the sampling.

In the non-native execution mode, sampling is performed at a secondary site after retrieving input data from the primary/production site over a network, such as the Internet. The non-native execution mode may be used when the primary/production site does not possess the ability and/or computation resources to perform the sampling onsite. Note that a non-native execution mode is necessary when sampling must be done across disparate data sources (such as a data warehouse and a No SQL database, for example).

Figure 1:
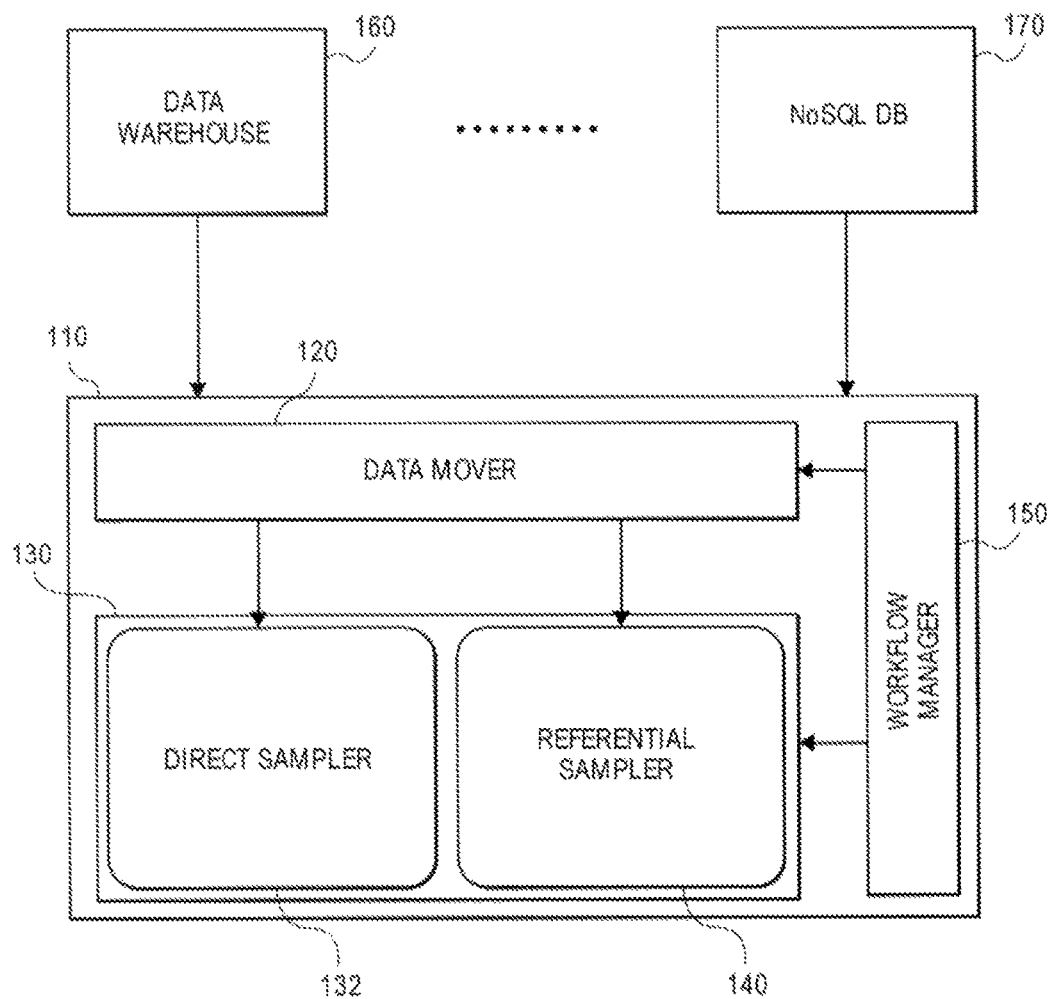
FIG. 1 is a block diagram of a system for referentially sampling polygot datasets according to an embodiment of the invention.

FIG. 1 is a block diagram of a system according to embodiments of the invention. The system of FIG. 1 may comprise computer system 110, data warehouse 160, and NoSQL database 170. Computer system 110 may correspond to a wide variety of computer systems, such as computer system 300 discussed in further detail below in reference to FIG. 3. In an embodiment, computer system 110 comprises data mover 120, sampling module 130, and workflow manager 150.

Data mover 120 corresponds to one or more software processes responsible for retrieving data from a primary/production site (such as data warehouse 160 and/or No SQL DB 170) and storing the retrieved data at a secondary location, which may be computer system 110 or a storage location external to but accessible by computer system 110.

In an embodiment, sampling module 130 comprises direct sampler 132 and referential sampler 140. Direct sampler 132 corresponds to one or more software processes responsible for retrieving and storing data using a direct sampling mode, while referential sampler 140 corresponds to one or more software processes responsible for retrieving and storing data using a referential sampling mode.

Workflow manager 150 corresponds to one or more software processes responsible for managing the workflow of performing referential sampling. In an embodiment, the actions carried out or delegated by workflow manager 150 will be described below in more detail in relation to FIG. 2.

Data warehouse 160 represents one type of disparate dataset which may be sampled by embodiments of the invention. Data warehouse 160 corresponds is a system used for reporting and data analysis. Data warehouse 160 may be a central repository of integrated data from one or more disparate sources.

NoSQl database 170 represents another type of disparate dataset which may be sampled by embodiments of the invention. NoSQl database 170 is a mechanism for the storage and retrieval of data that is modeled in means other than the tabular relations used in relational databases.

While two explicit examples of disparate data sources are depicted in FIG. 1, it should be understood that embodiments of the invention may be used with any number of disparate data sources.

Reducing the Storage Footprint of Digital Files

Figure 2:
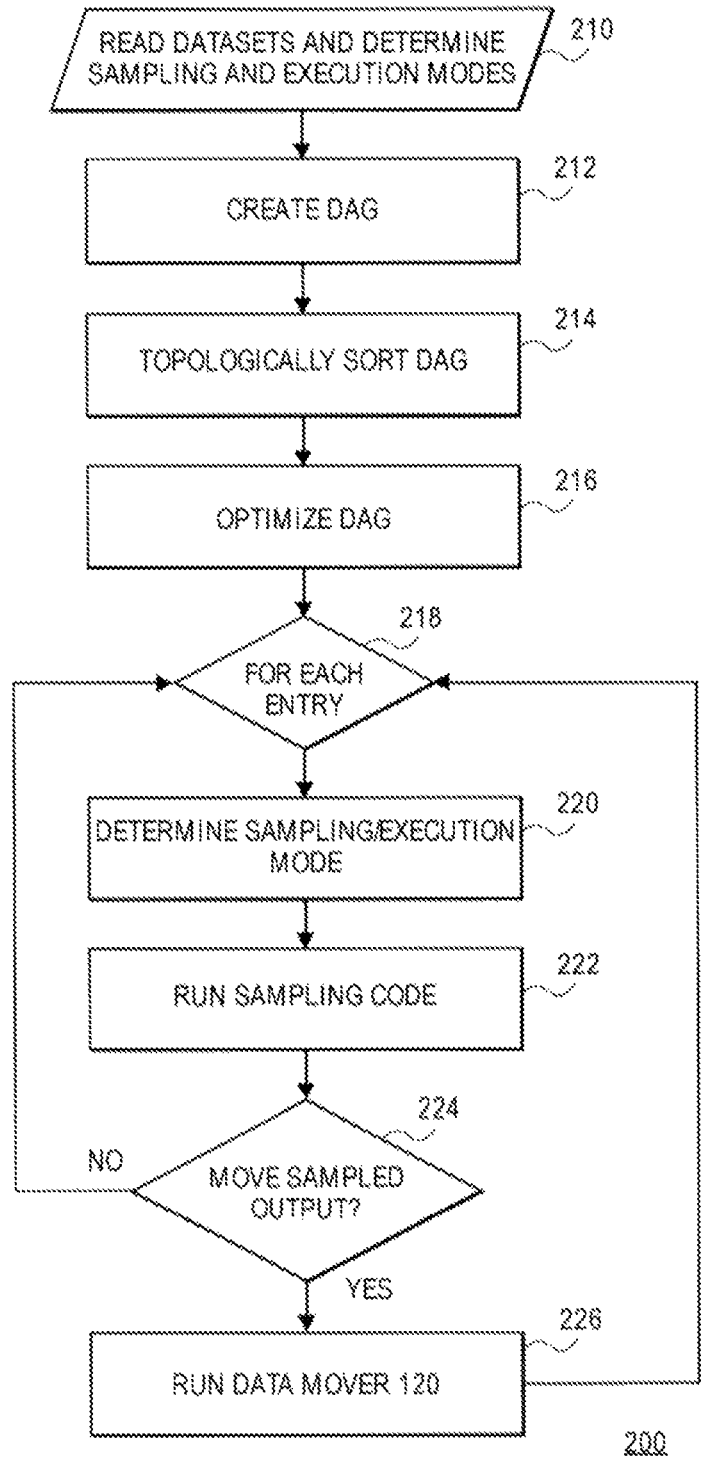
FIG. 2 is a flowchart of the process for referential sampling of polygot datasets according to one embodiment of the invention.

FIG. 2 is a flowchart 200 of the steps involved in performing referential sampling of polygot datasets according to one embodiment of the invention. In an embodiment, each of the steps of FIG. 2 may be performed by workflow manager 150 directly or may be performed by workflow manager 150 delegating responsibility to perform certain actions to another software entity.

In step 210, the particular datasets which need to be sampled are determined. In an embodiment, the number of sampled datasets retrieved using the step of flowchart 200 is equal to the number of datasets identified in step 210. For each dataset being sampled, a set of entities in each of the sampled datasets is identified. In addition, the sampling mode and the execution mode to be used for each entity are identified.

In step 212, a directed acyclic graph (DAG) is created for all entities in all the datasets being sampled. The DAG encodes the dependencies (the referential constraints) among the entities. The DAG is used to determine the order in which the entities will be processed.

In step 214, a topological sort of the DAG is performed. A topological sort is a linear ordering of the DAG's nodes (which represent the entities in all the datasets to be sampled) in such a way that if an entity $E_i$ is dependent upon another entity $E_j$, then $E_j$ will appear before $E_i$ in the sorted output. Thus, the topological sort provides the overall order in which the entities should be sampled so that the referential constraints between the entities can be honored.

In step 216, the topologically sorted output produced in step 214 is optimized for storage I/O by ensuring that, to the extent possible, all dependencies of the DAG can be sampled while the node is still in memory, thus minimizing the overall number of disk accesses.

Steps 218-226 depict actions performed on each node of the topologically sorted DAG. Initially, when step 218 is performed, the first node in the topologically sorted DAG is deemed the current node. Each subsequent time that step 218 is performed, the next node is traversed in the topologically sorted DAG and the new node becomes the current node. Recall that each node of the topologically sorted DAG represents an entity in a dataset being sampled. As depicted in FIG. 23, this process continues until all nodes of the topologically sorted DAG have been processed.

For each current node in the topologically sorted DAG, a determination is made in step 222 as to whether the entity associated with that node should be sampled in direct mode or referential mode as well as whether the execution mode for that entity should be native or non-native.

In step 222, sampling is performed on the entity associated with the current node. The results of performing the sampling on this entity may be stored in memory or materialized on disk.

In step 224, a determination is made as to whether it is necessary to transfer the sampled output for the current node from the primary/production site to a secondary location, such as where system 110 is located. If it is determined in step 224 that it is not necessary to transfer the sampled output for the current node from the primary/production site to a secondary location, then processing proceeds to step 218 to iterate to the next node in the topologically sorted DAG. However, if it is determined in step 224 that it is necessary to transfer the sampled output for the current node from the primary/production site to a secondary location, then processing proceeds to step 226. In step 226, data mover 120 retrieves the sampled output for the current node from the primary/production site to a secondary location, such as whether system 110 is located or another location accessible to system 110. Thereafter, processing proceeds to step 218 to iterate to the next node in the topologically sorted DAG.

Execution Workflow Example

For purposes of providing a simplified illustrative example, a workflow according to an embodiment of the invention shall be presented with respect to two tables, named Customers and Orders, where the Customers table stores personal information for all known customers while the Orders table keeps track of their respective orders over time. A relationship between the tables is established by means of a customer_id attribute that is defined in the Customers table and referenced in the Orders table for every order placed by the customer. Thus, the customer_id attribute acts as a referential constraint for the Orders table.

Note that this example involving two tables is a very simple example. In more typical implementations, the processing will necessarily be more complex as data from multiple disparate sources (such as data warehouses, No SQL database, and the like) will need to be processed together.

In this example, in performing the step 210 of FIG. 2, the tables Customers and Orders are identified as the entities to be sampled. In this assume, assume that in step 210 the Customers table is determined to be direct sampled to 10% while the Orders table will be referential sampled. Further assume for simplicity that both tables will be sampled in the native execution mode.

In this example, assume that in step 212, a DAG is created. The DAG will have an edge going from the Orders table to the Customers table indicates that Customers is a dependence for processing Orders.

In this example, in the performance of step 214 the DAG created in step 212 is topologically sorted. The resulting topologically sorted DAG will provide a linear ordering where Customers is the first node followed by Orders.

In performing step 216, the topologically sorted DAG is optimized. However, as this is a simple example involving only two entities, no optimization need be done to the topologically sorted DAG in this case.

Thereafter, the nodes of the topologically sorted DAG are processed in turn until all the nodes are processed. The first node in the topologically sorted DAG represents the Customers table. Since the Customers table must be direct sampled, a sampling mechanism is employed to extract a 10% sample from the Customer table. The second node in the topologically sorted DAG represents the Orders table. As the Orders table must be referentially sampled, a SQL query is generated that performs a join of the Orders table and the sampled Customers table. Note that this join is not between the entire Customers table but the sampled Customers table representing the extracted 10% sample. The extracted data from the Orders table will be consistent because for every row in the extracted Orders table, corresponding customer information will exist in the extracted Customer's table.

Hardware Mechanisms

Figure 3:
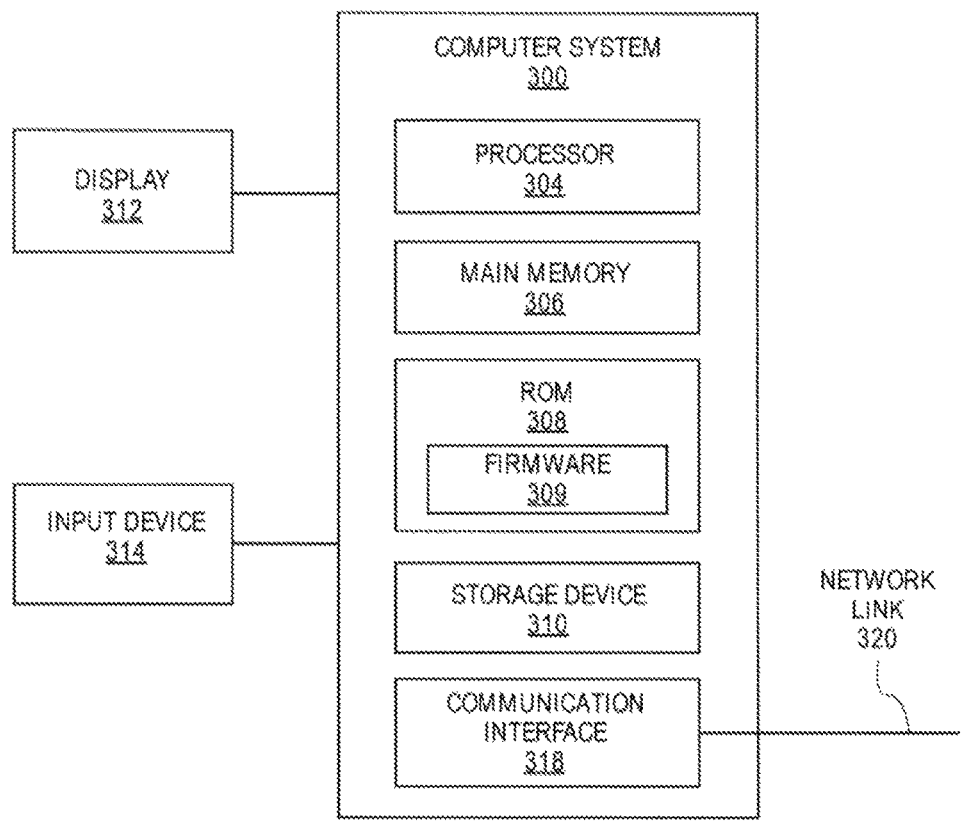
FIG. 3 is a block diagram that illustrates the hardware components of a computer system upon which an embodiment of the invention may be implemented.

FIG. 3 is a block diagram that illustrates a computer system 300 upon which an embodiment of the invention may be implemented. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device for storing static information and instructions for processor 304. A storage device 310, such as a magnetic disk or optical disk, is provided for storing information and instructions.

Computer system 300 may be coupled to a display 312, such as a cathode ray tube (CRT), a LCD monitor, and a television set, for displaying information to a user. An input device 314, including alphanumeric and other keys, is coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments of the invention may include any number of input devices 314 coupled to computer system 300.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory machine-readable storage mediums storing one or more sequences of instructions for referential sampling of disparate datasets, which when executed by one or more processors, cause:
   determining an execution mode and a sampling mode for each entity in a plurality of disparate datasets,
   wherein said each entity in the plurality of disparate datasets includes any tables in each of the plurality of disparate datasets,
   wherein said execution mode for said each entity in the plurality of disparate datasets may correspond to either a native mode or a non-native mode, wherein said native mode is performed locally with a particular dataset, and wherein said non-native mode is performed remotely to said particular dataset, and
   wherein said sampling mode for said each entity in the plurality of disparate datasets may correspond to either a direct mode or a referential mode, wherein the direct mode is used for sampling a particular dataset on its own without reference to another dataset, and wherein said referential mode is used for sampling said particular dataset in relation to other datasets;
   creating a directed acyclic graph (DAG) for each entity in the plurality of disparate datasets;
   topologically sorting the directed acyclic graph (DAG) to produce a topologically sorted directed acyclic graph (DAG); and
   retrieving one or more sampled datasets from the plurality of disparate datasets using the topologically sorted directed acyclic graph (DAG),
   wherein the one or more sampled datasets constitute a consistent sample that honors all referential constraints in the plurality of disparate datasets.

2. The one or more non-transitory machine-readable storage mediums of claim 1, wherein execution of the one or more sequences of instructions further cause:
   prior to retrieving said one or more sampled datasets using said topologically sorted directed acyclic graph (DAG), optimizing said topologically sorted directed acyclic graph (DAG) to ensure that, to the extent possible, all dependencies of each node of the topologically sorted directed acyclic graph DAG can be sampled while said each node is in memory.

3. The one or more non-transitory machine-readable storage mediums of claim 1, wherein retrieving said sampled dataset from the plurality of disparate datasets using the topologically sorted directed acyclic graph (DAG) comprises:
   traversing the topologically sorted directed acyclic graph (DAG) to retrieve data from entities in said plurality of disparate datasets in an order based on nodes of the topologically sorted directed acyclic graph (DAG).

4. The one or more non-transitory machine-readable storage mediums of claim 1, wherein the number of datasets in said one or more sampled datasets retrieved from the plurality of disparate datasets is equal to the number of datasets in said plurality of disparate datasets.

5. An apparatus for referential sampling of disparate datasets, comprising:
   one or more processors; and
   one or more non-transitory computer-readable storage mediums storing one or more sequences of instructions, which when executed, cause:
      determining an execution mode and a sampling mode for each entity in a plurality of disparate datasets,
   wherein said each entity in the plurality of disparate datasets includes any tables in each of the plurality of disparate datasets,
   wherein said execution mode for said each entity in the plurality of disparate datasets may correspond to either a native mode or a non-native mode, wherein said native mode is performed locally with a particular dataset, and wherein said non-native mode is performed remotely to said particular dataset, and
      wherein said sampling mode for said each entity in the plurality of disparate datasets may correspond to either a direct mode or a referential mode, wherein the direct mode is used for sampling a particular dataset on its own without reference to another dataset, and wherein said referential mode is used for sampling said particular dataset in relation to other datasets;
   creating a directed acyclic graph (DAG) for each entity in the plurality of disparate datasets;
   topologically sorting the directed acyclic graph (DAG) to produce a topologically sorted directed acyclic graph (DAG); and
   retrieving one or more sampled datasets from the plurality of disparate datasets using the topologically sorted directed acyclic graph (DAG),
      wherein the one or more sampled datasets constitute a consistent sample that honors all referential constraints in the plurality of disparate datasets.

6. The apparatus of claim 5, wherein execution of the one or more sequences of instructions further cause:
   prior to retrieving said one or more sampled datasets using said topologically sorted directed acyclic graph (DAG), optimizing said topologically sorted directed acyclic graph (DAG) to ensure that, to the extent possible, all dependencies of each node of the topologically sorted directed acyclic graph DAG can be sampled while said each node is in memory.

7. The apparatus of claim 5, wherein retrieving said sampled dataset from the plurality of disparate datasets using the topologically sorted directed acyclic graph (DAG) comprises:
   traversing the topologically sorted directed acyclic graph (DAG) to retrieve data from entities in said plurality of disparate datasets in an order based on nodes of the topologically sorted directed acyclic graph (DAG).

8. The apparatus of claim 5, wherein the number of datasets in said one or more sampled datasets retrieved from the plurality of disparate datasets is equal to the number of datasets in said plurality of disparate datasets.

9. A method for referential sampling of disparate datasets, comprising:
   determining an execution mode and a sampling mode for each entity in a plurality of disparate datasets,
   wherein said each entity in the plurality of disparate datasets includes any tables in each of the plurality of disparate datasets,
   wherein said execution mode for said each entity in the plurality of disparate datasets may correspond to either a native mode or a non-native mode, wherein said native mode is performed locally with a particular dataset, and wherein said non-native mode is performed remotely to said particular dataset, and wherein said sampling mode for said each entity in the plurality of disparate datasets may correspond to either a direct mode or a referential mode, wherein the direct mode is used for sampling a particular dataset on its own without reference to another dataset, and wherein said referential mode is used for sampling said particular dataset in relation to other datasets;

creating a directed acyclic graph (DAG) for each entity in the plurality of disparate datasets;

topologically sorting the directed acyclic graph (DAG) to produce a topologically sorted directed acyclic graph (DAG); and retrieving one or more sampled dataset from the plurality of disparate datasets using the topologically sorted directed acyclic graph (DAG), wherein the one or more sampled datasets constitute a consistent sample that honors all referential constraints in the plurality of disparate datasets.

10. The method of claim 9, further comprising:

prior to retrieving said one or more sampled datasets using said topologically sorted directed acyclic graph (DAG), optimizing said topologically sorted directed acyclic graph (DAG) to ensure that, to the extent possible, all dependencies of each node of the topologically sorted directed acyclic graph DAG can be sampled while said each node is in memory.

11. The method of claim 9, wherein retrieving said sampled dataset from the plurality of disparate datasets using the topologically sorted directed acyclic graph (DAG) comprises:

traversing the topologically sorted directed acyclic graph (DAG) to retrieve data from entities in said plurality of disparate datasets in an order based on nodes of the topologically sorted directed acyclic graph (DAG).

12. The method of claim 9, wherein the number of datasets in said one or more sampled datasets retrieved from the plurality of disparate datasets is equal to the number of datasets in said plurality of disparate datasets.

* * * * *